Oct. 3, 1933.  A. F. GILLET  1,928,932
NONSLIP DEVICE FOR VEHICLE WHEELS
Filed March 24, 1933    2 Sheets-Sheet 1
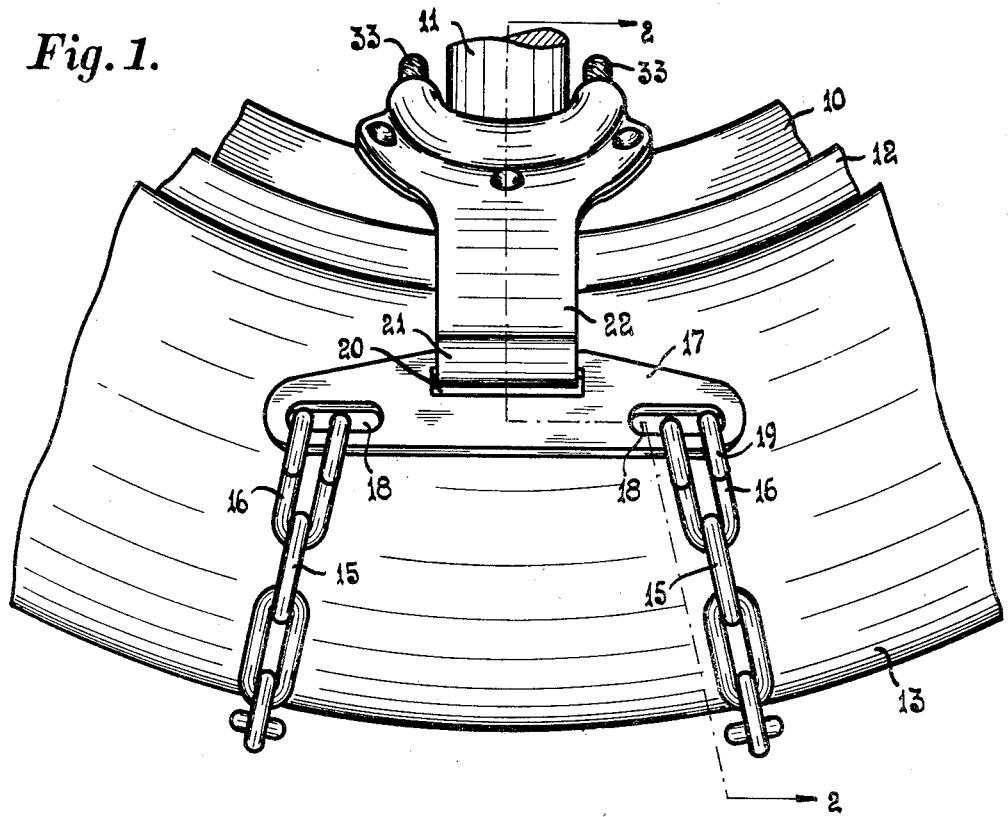
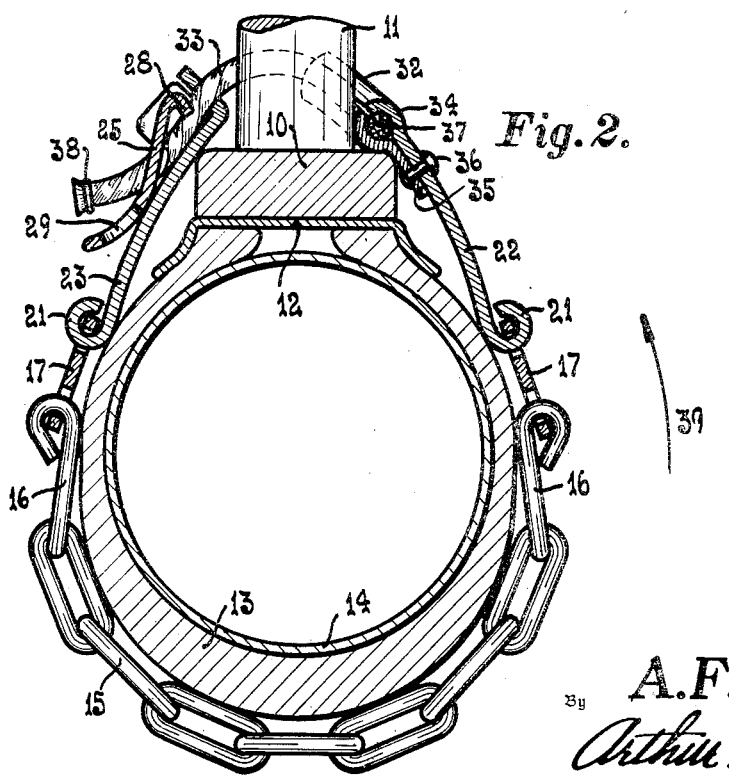
Inventor
A. F. Gillet
By Arthur H. Sturges
Attorney Oct. 3, 1933.  A. F. GILLET  1,928,932
NONSLIP DEVICE FOR VEHICLE WHEELS
Filed March 24, 1933  2 Sheets-Sheet 2
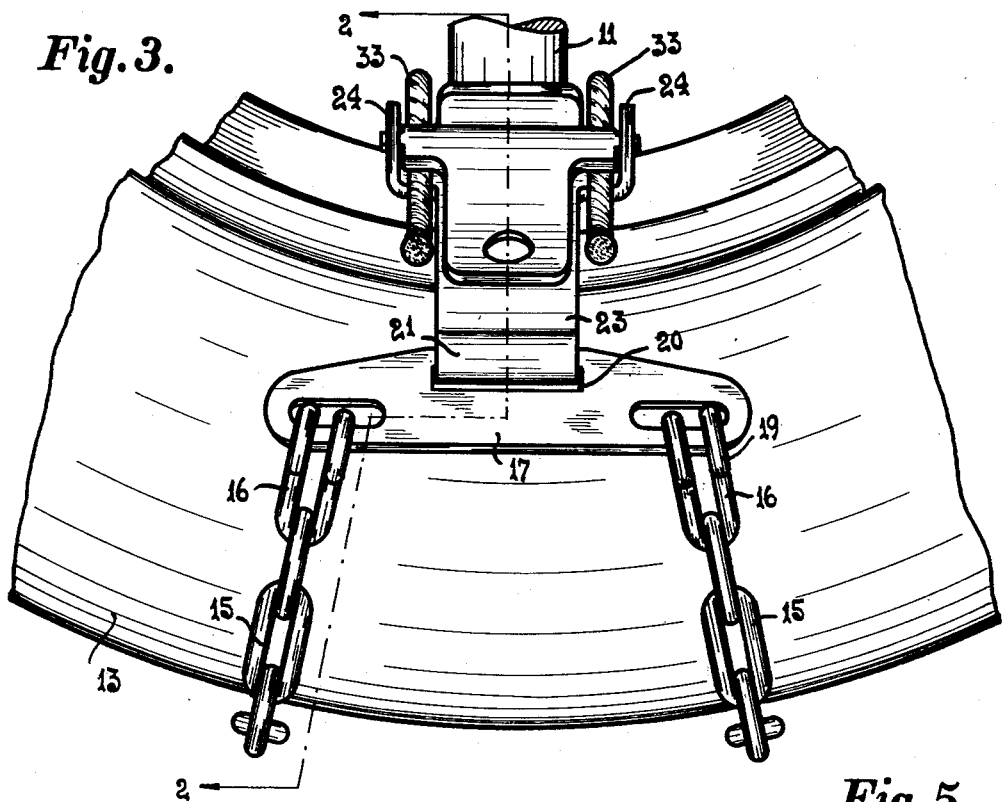
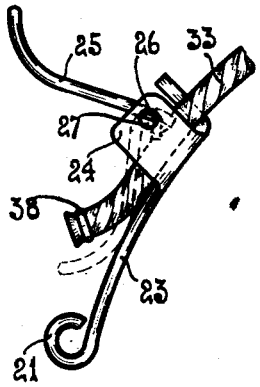
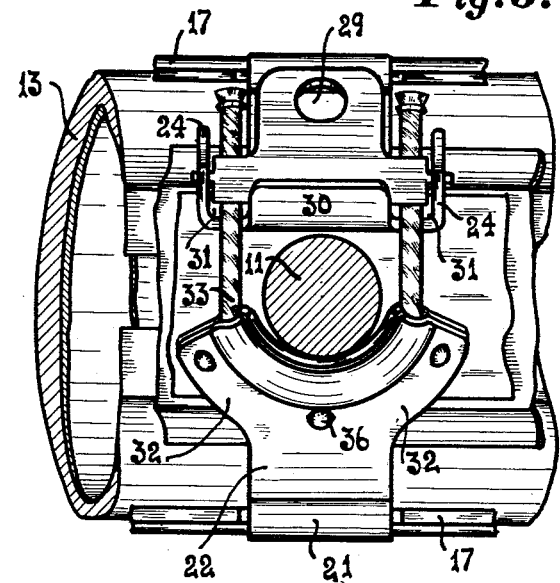
Inventor
A. F. Gillet
By Arthur H. Sturges
Attorney Patented Oct. 3, 1933

1,928,932

UNITED STATES PATENT OFFICE 1,928,932

NONSLIP DEVICE FOR VEHICLE WHEELS

Alexis F. Gillet, Omaha, Nebr., assignor to Jubilee Manufacturing Co., Omaha, Nebr., a corporation of Nebraska Application March 24, 1933. Serial No. 662,507

1 Claim. (Cl. 152—14)

The present invention relates to non-slip devices for vehicle wheels, otherwise known as antiskid traction chains for tires, and more particularly to the type known as cross chain devices which are adapted to encircle the tire, rim and felloe of vehicle wheels.

As heretofore practiced in the art the transverse turning movements of cross chains, with respect to their carrying wheels, has been attempted to be prevented by various expedients such as the employment of elongated plates mounted at each end of the chains and positioned, in use, in alignment with the side walls of the tire, said plates being of greater length than the distance between two spokes, an objection to this type of device is that the plates in order to function must be attached to comparatively elongated chains especially when applied to tires of large diameters. The chains being composed of tempered steel comprise a more expensive portion of such devices. The said tendency for turning movement is inherent within all emergency or tire chains of the cross chain type to which the instant invention is related, in that said type are provided with heavy outside clamps and thus have a heavy side and a light side when applied to an automobile wheel.

An object of the invention is to provide a device, the chains of which are comparatively short whereby an economical construction is provided which will prevent said turning movements and assure that the fragile portions of the device will not become positioned, in use, under the tread of the tire to the injury of the latter and said portions, said device being adapted to be applied to and interchanged upon a larger number of different sizes of tires than has been practiced heretofore in the art.

Another object of the invention is to provide a non-slip device for vehicle wheels provided with radially disposed spokes wherein the device is prevented from transverse turning sliding movements with respect to the wheels by a peculiar construction adapted to abut against or mate with a spoke for preventing said movements.

The invention will be more fully described hereinafter wherein other objects and advantages are more particularly pointed out and claimed.

In the drawings, wherein like symbols refer to like or corresponding parts throughout the several views:

Figure 1 is a side elevation of the device as applied to the inwardly facing side of a fragment of a vehicle wheel and showing the top side of the device.

Figure 2 is a transverse section taken on the lines 2—2 of Figures 1 and 3 and looking in the direction of the respective arrows thereof, said section being taken through a portion of the tire as applied to a vehicle wheel and having a non-slip traction device constructed according to this invention applied thereto.

Figure 3 is a view similar to Figure 1, except that the clamp side of the device is illustrated.

Figure 4 is a detail showing an edge view of a clamp employed, the lever thereof being in a raised position.

Figure 5 is a top plan view of a fragment of the wheel showing the new device assembled thereon.

Referring to the drawings, the wheel is shown fragmentarily and has a felly 10, spoke 11 and a rim 12. These parts may be of any conventional form, the rim 12 carrying a tire 13 provided with an inner tube 14, the spoke being composed of wood or wire. The non-slip device of this invention includes a chain 15 or a pair of chains which are adapted to extend across the tread of the tire 13 in parallel alignment with respect to each other in instances when a pair are employed. The chains are formed of tempered metal and adapted to resist wear and provided at their ends with chain hooks 16.

End plates, indicated at 17, are provided with apertures 18 through which the ends 19 of the hooks 16 of the chain hooks are positioned for securing the latter to the end plates by bending and closing said free ends, thus providing a flexible connection between the chains and end plates. The free ends 19 of the chain hooks are bent outwardly during the closing operation to insure that the smooth side of the chain hooks will lie, in use, against the soft rubber side wall of the tire 13.

The end plates are provided with elongated medially positioned apertures 20 which are adapted to receive the eyes 21 carried at an end of a stop arm 22 and a clamp arm 23 whereby the stop and the clamp arms are pivotally mounted with respect to the end plates 17.

As the end plates 17 have the apertures 18 at opposite ends and the elongated central aperture 20, the chains 15 are held apart and from twisting. The plate 17 lies substantially flat against or adjacent the side of the tire and may follow the angle of the side of the tire by its hinged movement on the eye 21 of the stop arm 22 and on the hooks 16 of the chains.

The stop arm 22 is shown broad to fit the central opening 20 and to hold the plate 17 from edgewise displacement and from swinging out at its ends from the tire. The rigid plates 17 and rigid arms 22 and 23 hold the chains 15 transversely and circumferentially from shifting on the tire and also from relative shifting.

The clamp arm 23 is provided with outwardly projecting ears 24 between which a clamp lever 25 is pivotally mounted. The clamp lever is provided with stub axles 26 which extend through the ears 24, apertures 27 being provided through the walls of the ears for receiving the axles, whereby a pivotal mounting for the lever is provided.

As best shown in Figure 2, the lever 25 is provided with a bit 28 which is eccentrically positioned with respect to the axles thereof for purposes later described. The free end of the lever is bent outwardly with respect to the main body portion thereof, as shown in Figure 2, and provided with an implement receiving aperture 29 for purposes such as later mentioned.

The end of the clamp arm 23 opposite to its eye 21 is provided with an outwardly turned tongue 30, and notches 31 are provided between the edges of the tongue 30 and the ears 24 of the clamp, said notches being adapted to receive flexible securing members as later explained.

It will be noted that as best shown in Figure 2, the clamp arm 23 and stop arm 22 are preferably arcuate in shape with respect to their length.

The stop arm 22 is preferably bifurcated at its end opposite to its eye 21 whereby a substantially Y-shaped member is provided having fingers 32 which extend outwardly and divergently from the main body portion of the stop arm. The fingers are provided with an attaching means for the flexible securing members 33. The attaching means may include apertures or the like formed through the fingers 32 or the arm 22, the preferred manner being to form the upper edges of the fingers, adjacent the crotch of the Y, semicircular in cross section as indicated at 34 and securing a similarly shaped and oppositely disposed clip 35 to the arm by any suitable means such as the rivets 36 whereby an aperture 37 is provided between the clip and fingers.

Prior to permanently positioning the clip and fingers together flexible securing members are positioned in the aperture 37 and it will be understood that when the riveting operation has been completed that the flexible securing members are immovably positioned with respect to the fingers by means of the snug fit afforded by the compression or squeezing of said members between the fingers and the clip incident to the said operation.

In instances where the free ends 33 of the flexible securing members are formed of an integral strand of rope the said squeeze fit may be omitted. The securing members 33 may be of any desired length for accommodating a large range of tire diameters and when formed of rope the free ends thereof are provided with ferrules 38 or the like for preventing the unraveling or fraying of the strands comprising the rope.

In operation the anti-slip device of this invention is applied to a vehicle wheel substantially as shown in Figure 2 and it will be understood that the clamp is positioned upon the outside of the wheel or that side of the wheel which is furtherest from the body of the vehicle thereby positioning the stop arm upon the inside of the wheel or that side thereof closest to said body. The arrow 39 may, for the purpose of clarifying the meaning of the term "inside of the wheel", be considered the body of the vehicle.

The proper positioning of the device is important in that the clamp when placed upon the outside of the tire is more readily accessible for securing the device upon the wheel and for positioning the bifurcated end of the arm in a manner whereby it will member with or abut against a spoke for preventing transverse movements of the device with respect to the wheel. As thus described it will be noted that the spoke will be received within the crotch of the bifurcated arm stop, should the chain turn sufficient for said engagement; whereupon a further turning movement of the stop past the spoke will be prevented.

It will be understood that as the wheel revolves during the forward travel of the vehicle that the cross chains of the device upon becoming freed from the ground will become slack and the device as a whole become slack with respect to the wheel, centrifugal force generated by the revolvable movements of the wheel causing said slackening. As soon as the cross chain of the device is freed from the ground, transverse turning movement of the device with respect to the wheel is generated and said turning movement will be in the direction of the arrow 39 (Figure 2) in that the clamp is of greater weight than the stop whereby the weight being upon the outside of the wheel will move the chain in the said direction. By means of the present invention said turning movement is prevented in that the crotch of the stop arm will engage against the spoke thereby preventing the clamp from being substituted for the chain or engaging with the road thus preventing injury to the tire and wear or breakage of the clamp.

It will be noted that the flexible securing members 33 are positioned at each side of the spoke thus preventing creeping of the device along the perimiter of the wheel and insuring that the spoke will be useable for preventing transverse turning movement of the device.

In applying the device to a wheel the lever 25 of the clamp is raised, as shown in Figure 4, the free ends of the securing members are passed in under the bit of the lever and the latter moved to a closed position causing the bit to engage the securing members. A large nail, screw driver or similar implement may be inserted through the aperture 29 of the lever for facilitating the operation. As thus described it will be understood that the securing members 33 are positioned under the bit adjacent the outer ends thereof by means of the notches 31 provided by the flange 30 of the clamp arm. An advantage of this being that the securing members will thus be held away from the spoke for preventing wear upon the finish surface thereof. The wear incident to the contact of the stop arm with the spoke will occur upon the inside of the wheel. The shape of the end of the stop arm being arcuate substantially conforms to the cross sectional shape of the spoke whereby wear is minimized and the wear being upon the inside of the spoke, should the latter become marred, such marred surface is in an inconspicuous position upon the inside of the wheel adjacent the brake drum.

The device of this invention is shown applied to a tire of comparatively small diameter and it will be understood that when applied to large sized tires that the clamp and stop arms will be positioned against the upper portions of the side walls of the tires.

While I have shown and described the preferred embodiment of my invention, it is to be understood that minor changes in construction, combination and arrangement of parts may be made without departing from the spirit and scope of the following claim.

I claim:—

A non-slip device for vehicle wheels provided with spokes, comprising a pair of chains adapted to extend across the tread of a tire, plates at the ends of the chains, a clamp arm carried by a plate, a stop arm carried by a plate positioned at the ends of the chains opposite to said clamp arm, flexible securing members carried by the stop arm and adapted to be positioned at each side of a spoke and interlock with the clamp for preventing creeping movements of the chains along the perimeter of the wheel, said stop arm being adapted to abut against the spoke for preventing transverse turning movements of the stop arm past the spoke.

ALEXIS F. GILLET.